(12) United States Patent
Sun et al.

(10) Patent No.: US 7,322,194 B2
(45) Date of Patent: Jan. 29, 2008

(54) SYSTEM AND METHOD FOR REDUCING SURGE

(75) Inventors: Harold Sun, W. Bloomfield, MI (US); Richard Baker, Dearborn Heights, MI (US); John Vanderslice, Berkley, MI (US); Jeffrey B. Schneyer, Farmington Hills, MI (US); William Ruona, Farmington Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 150 days.

(21) Appl. No.: 11/239,553

(22) Filed: Sep. 28, 2005

(65) Prior Publication Data

US 2007/0068158 A1 Mar. 29, 2007

(51) Int. Cl.
*F02M 25/07* (2006.01)
*F02B 33/44* (2006.01)
*F02D 23/00* (2006.01)

(52) U.S. Cl. .................. 60/605.2; 60/602; 123/568.11; 123/568.12

(58) Field of Classification Search ............... 60/605.2, 60/568.11, 568.12, 606, 602; F02B 37/16, F02B 37/20, 37/22, 37/18, 33/44, 47/08; F02M 27/05
See application file for complete search history.

(56) References Cited

U.S. PATENT DOCUMENTS

| | | | | |
|---|---|---|---|---|
| 4,215,550 A | * | 8/1980 | Dinger et al. | 60/606 |
| 4,833,886 A | * | 5/1989 | Meier | 60/602 |
| 5,724,813 A | * | 3/1998 | Fenelon et al. | 60/606 |
| 6,381,961 B1 | * | 5/2002 | Bischoff | 60/605.2 |
| 6,470,864 B2 | * | 10/2002 | Kim et al. | 60/605.2 |
| 6,725,660 B2 | | 4/2004 | Hidaka | 60/602 |
| 6,973,785 B2 | * | 12/2005 | Umehara et al. | 60/605.2 |
| 7,032,382 B2 | * | 4/2006 | Onodera et al. | 60/606 |
| 7,107,770 B2 | * | 9/2006 | Shirakawa | 60/605.2 |
| 2004/0211375 A1 | | 10/2004 | Spath | |
| 2004/0244375 A1 | | 12/2004 | Kono et al. | 60/605.2 |
| 2006/0021347 A1 | * | 2/2006 | Sun et al. | 60/612 |
| 2006/0070381 A1 | * | 4/2006 | Parlow et al. | 60/612 |
| 2006/0101819 A1 | * | 5/2006 | Schorn et al. | 60/602 |
| 2006/0185363 A1 | * | 8/2006 | Gustafson et al. | 60/605.2 |
| 2007/0012030 A1 | * | 1/2007 | Shirakawa | 60/605.2 |

* cited by examiner

*Primary Examiner*—Thai-Ba Trieu
(74) *Attorney, Agent, or Firm*—Allan J. Lippa; Alleman Hall McCoy Russell & Tuttle LLP

(57) ABSTRACT

A method for controlling an engine having an intake manifold and an exhaust manifold, where an exhaust gas recirculation path with a valve is provided between said intake and exhaust manifold, and the engine has a turbocharger; the method comprising during at least one decreased engine output condition, increasing opening of the exhaust gas recirculation valve and adjusting exhaust expansion through a turbine of the turbocharger to decrease expansion through the turbocharger and thereby reduce a likelihood of turbocharger surge.

14 Claims, 4 Drawing Sheets

SYSTEM AND METHOD FOR REDUCING SURGE

FIELD

The present application relates generally to the control of an internal combustion engine powered by diesel fuel, and more specifically to a system and method to eliminate tip-out surge of turbocharged diesel engine.

BACKGROUND

Engines may use a turbocharger to improve engine torque/power output density. In one example, a turbocharger may include a compressor and a turbine connected by a common shaft, where the turbine is coupled to the exhaust manifold side and the compressor is coupled to the intake manifold side. In this way, the exhaust-driven turbine supplies energy to the compressor to increase the flow of air into the engine.

In some conditions, turbocharged diesel engines may experience a phenomenon known as "surge." For example, during a heavy driver tip-out, the engine may slow down while the turbocharger continues to spin for some time before it gradually slows down. This delay may be at least partially due to inertia and continuing power input from the exhaust turbine. The engine slow down causes a continuing reduction of air flow through engine. Further, the continuing action of the turbocharger can cause rapid pressure build-up on the compressor outlet or intake manifold side and rapid pressure reduction/drain on the turbine or exhaust manifold side. Compressors surge may occur when forward flow through the compressor can no longer be sustainable, due to an increase in pressure across the compressor, and a momentary flow reversal occurs. Once surge occurs, the reversal of flow reduces the discharge pressure or increases the suction pressure, thus allowing forward flow to resume again until the pressure rise again reaches the surge point. Such flow instability and the resultant noise can be referred to as "surge."

One approach to address surging is described in U.S. Pat. No. 6,725,660. In the '660 reference, a control action that temporarily increases the opening of nozzle vanes located before the turbine inlet is performed immediately after deceleration. Allegedly, the flow velocity of the exhaust striking the turbine is abruptly reduced so that a state resembling the application of a braking force to the turbine is produced. This braking force is used to abruptly decrease the rotational speeds of the turbine and compressor. As a result, the compressor pressure ratio can be reduced, so that surging can be prevented.

However, the inventors herein have recognized that this approach may provide degraded results under some conditions and may still result in surge. For example, under some conditions, high levels of EGR may be used to decrease NOx emissions. The high EGR levels can then push the engine breathing line closer to a surge line even at steady state since turbochargers are typically matched to meet low engine speed and full load torque requirements close to the surge line. During heavy engine tip-outs, the engine decelerates, while turbochargers, due to their inertia and continuous power input from turbines, continue to spin before they gradually slow down Thus, even with increased braking of the turbine, the pressure at the compressor outlet side may not be released to a level low enough to prevent compressor surge.

Another approach that attempts to prevent surging is described in U.S. Patent Application No. 2004/0244375. The '375 reference shows an intake air release means that opens an EGR valve and causes part of the intake air present in intake passage to flow into the exhaust passage via EGR passage, thereby reducing the intake pressure inside the intake when the vehicle is decelerating.

Again, the inventors herein have recognized a problem with such an approach. For example, under some conditions, the pressure expansion ratio across the turbine can be relatively high (due to flow resistance in the turbine). In other words, the pressure at turbine inlet, or the pressure of exhaust manifold, is relatively high. Thus, only a small amount of EGR can flow to the engine exhaust side. As a result, the intake manifold pressure, or the pressure of the compressor outlet, may not decrease enough to prevent the flow reversal (surge) in the compressor under some conditions.

SUMMARY

In one embodiment, the above problems are addressed by utilizing both increased EGR opening and decreased turbine expansion, which makes it possible to achieve an advantageous interaction that can reduce turbocharger surge under a wide variety of conditions.

For example, decreasing the turbocharger expansion decreases power input to the compressor and slows down the compressor. At the same time, since the pressure at exhaust manifold side is reduced (due to decreased expansion), the pressure differential between intake manifold and exhaust manifold is increased. Thus, more flow from the intake side can flow to the exhaust side to effectively drain the intake manifold. Consequently, the pressure at the outlet of the compressor is further decreased. In this way, the combined action of open both increasing EGR valve opening and decreasing turbocharger expansion can effectively reduce surging under a wider variety of engine deceleration conditions.

DETAILED DESCRIPTION

Figure 1:
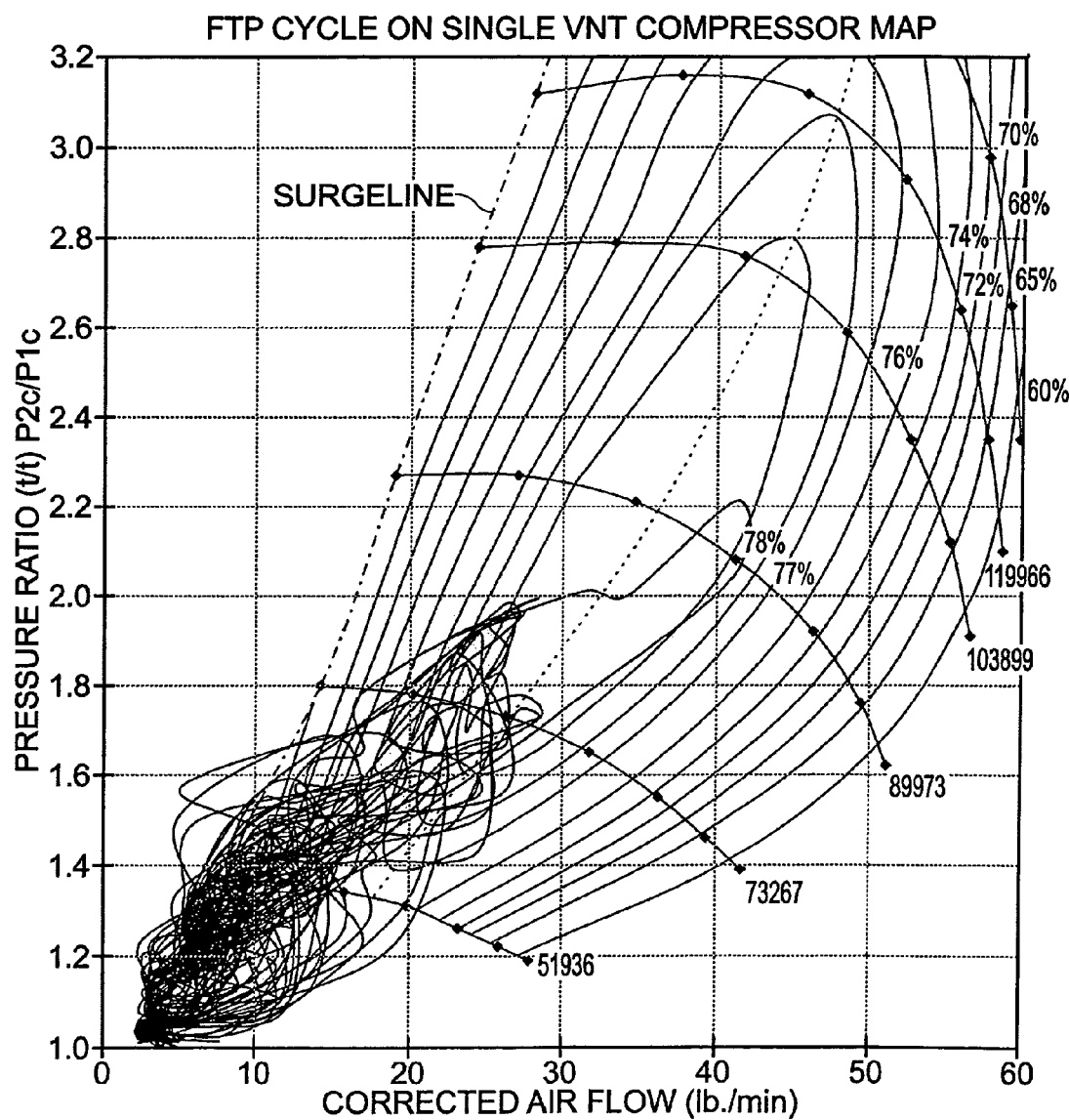
FIG. 1 is FTP cycle data on single VNT compressor map illustrating surge.

FIG. 1 illustrates the federal test procedure (FTP) cycle on a single VNT compressor map. The surge line is shown on the map as a dotted line. FIG. 1 shows that some operation points run into the surge line with modest EGR during the FTP cycle (only light tip-outs are involved). The compressor surge can cause excessive noise and may lead to damage to the compressor.

Figure 2:
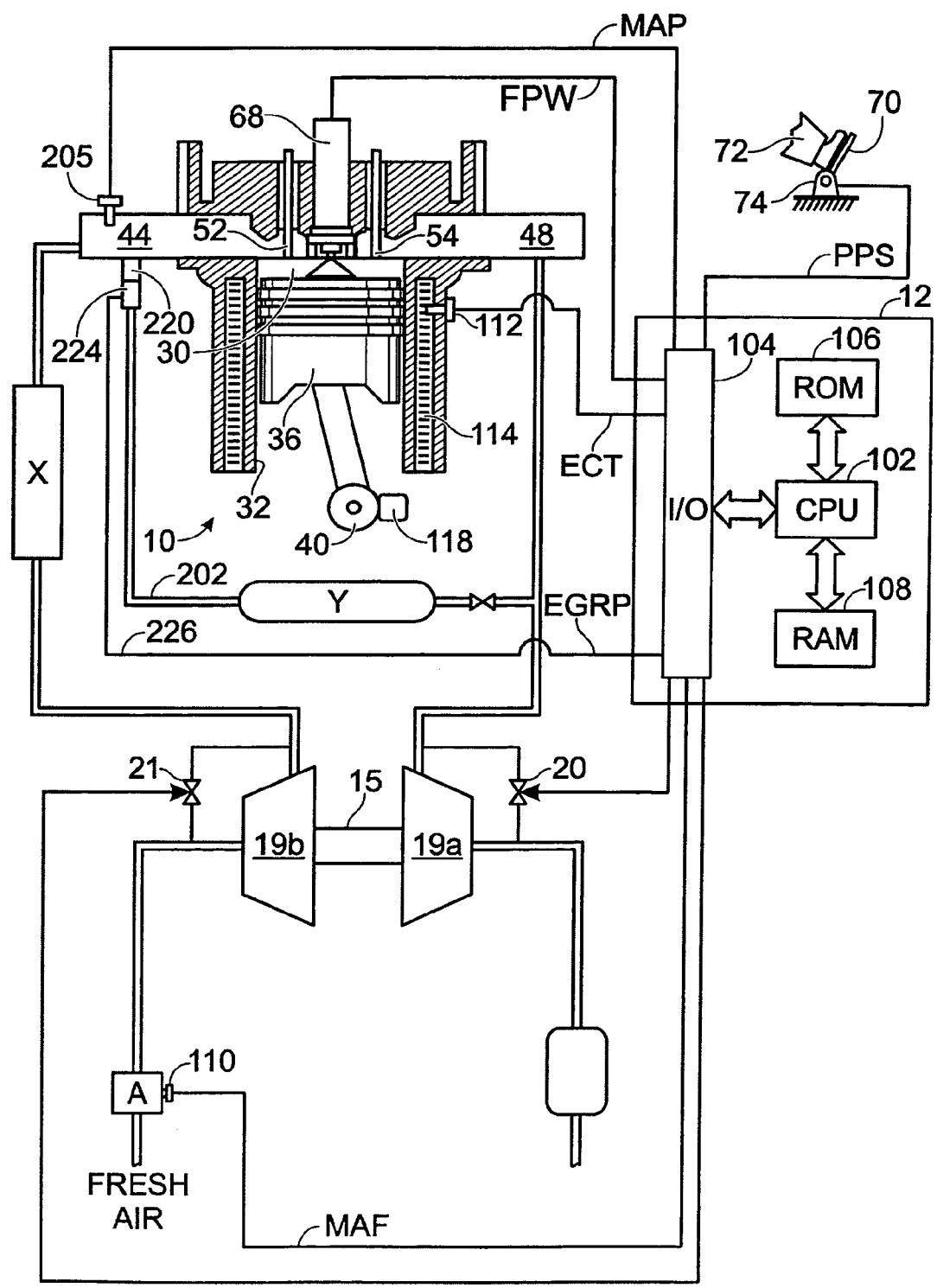
FIG. 2 is a block diagram of a turbocharged engine.

FIG. 2 shows an example of a turbocharged engine with an EGR system. Specifically, internal combustion engine 10, comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Intake manifold 44 is also shown having fuel injector 68 coupled thereto for delivering fuel in proportion to the pulse width of signal (FPW) from controller 12.

In the embodiment described herein, controller 12 is a microcomputer, including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including but not limited to: measurements of inducted mass air flow (MAF) from mass air flow sensor 110 coupled to the air filter; a measurement of manifold pressure (MAP) from manifold pressure sensor 205 coupled to intake manifold 44; and a profile ignition pick up signal (PIP) from Hall effect sensor 118 coupled to crankshaft 40 indicating an engine speed (N).

Exhaust gas is delivered to intake manifold 44 by EGR tube 202 communicating with exhaust manifold 48. EGR valve assembly 220 is located in EGR tube 202. Stated another way, exhaust gas travels from exhaust manifold 48 first through valve assembly 220, then to intake manifold 44. EGR valve assembly 220 can then be said to be located upstream of the intake manifold. There is also an optional EGR cooler (Y in FIG. 2) placed in EGR tube 202 to cool EGR before entering the intake manifold.

Pressure sensor 205 provides a measurement of manifold pressure (MAP) to controller 12. EGR valve assembly 220 has a valve position (not shown) for controlling a variable area restriction in EGR tube 202, which thereby controls EGR flow. EGR valve assembly 220 can either minimally restrict EGR flow through tube 202 or completely restrict EGR flow through tube 202, or operate to variably restrict EGR flow. Vacuum regulator 224 is coupled to EGR valve assembly 220. Vacuum regulator 224 receives actuation signal (226) from controller 12 for controlling valve position of EGR valve assembly 220. In one embodiment, EGR valve assembly is a vacuum actuated valve. However, any type of flow control valve may be used, such as, for example, an electrical solenoid powered valve or a steper motor powered valve.

Turbocharger 19 has a turbine 19a coupled in the exhaust manifold 48 and a compressor 19b coupled in the intake manifold 44 via an intercooler (X in FIG. 2). Turbine 19a is typically coupled to compressor 19b via a drive shaft 15. Various types of turbochargers and arrangements may be used. For example, a variable geometry turbocharger (VGT) may be used where the geometry of the turbine and/or compressor may be varied during engine operation. Alternately, or in addition, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve. FIG. 2 shows an example valve 20 acting as a waste gate. As noted above, the valve may be located within the turbine, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.) to reduce surge while reducing driveability and/or emission impacts.

FIG. 2 shows an example valve 20 acting as a waste gate. As noted above, the valve may be located within the turbine, or may be a variable nozzle. FIG. 2 further shows a valve 21 around compressor 19b.

Additional details of control routines are included below which can be used with various engine configurations, such as those described above. As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12.

Figure 3:
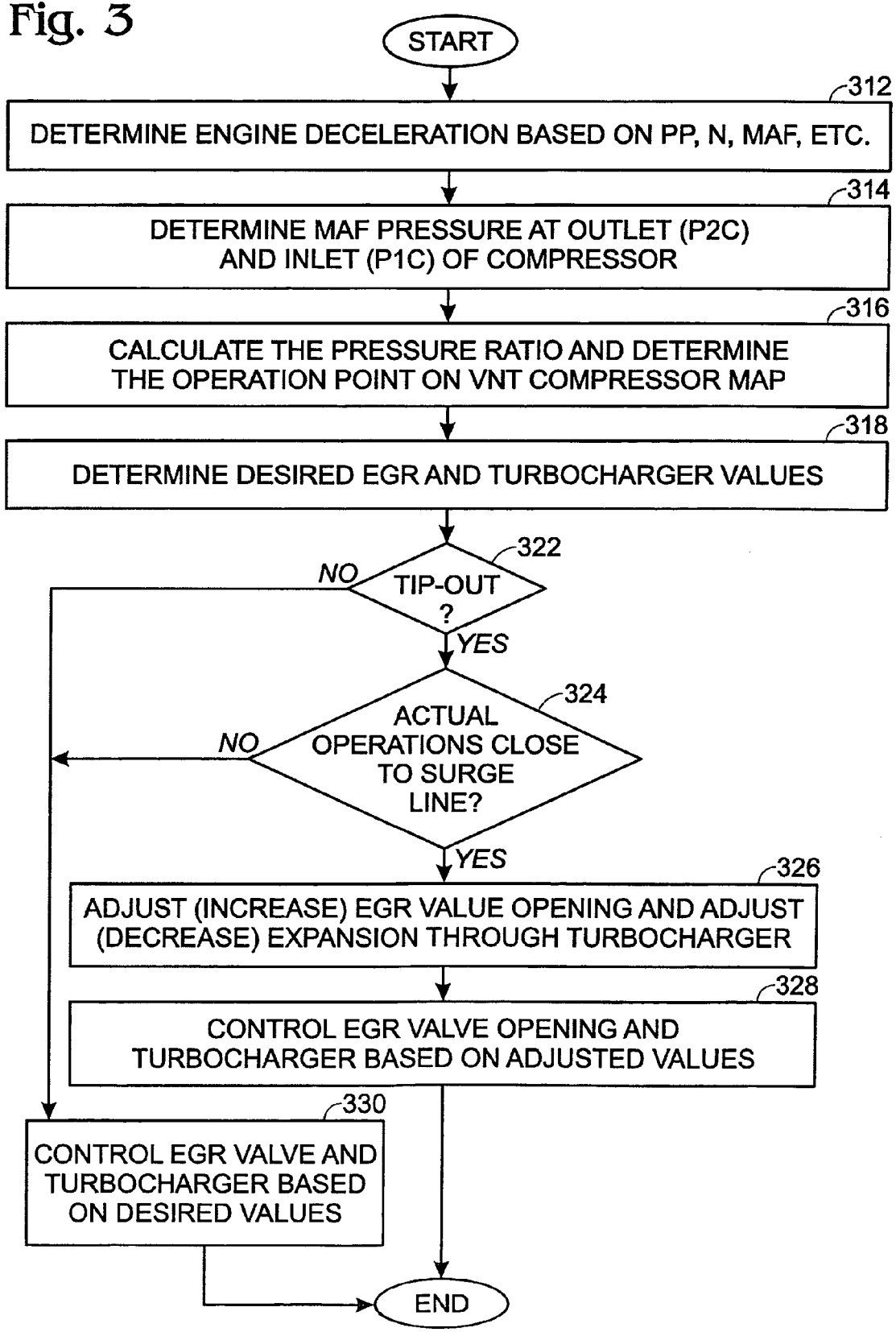
FIG. 3 is a flowchart illustrating control methods.

Referring now to FIG. 3, a routine is described for controlling engine operation to reduce surge. In step 312, the routine determines deceleration of engine 10 based on a pedal position (PP), engine speed (N), or mass air flow (MAF). For example, if the pedal position falls below a threshold value while the vehicle is traveling greater than a selected speed, a tip-out may be identified. Note also that the deceleration can be determined based on other parameters, if desired. For example, deceleration can be determined by the pressure in the intake or exhaust manifold.

Next, in step 314, the routine measures the pressures at the outlet and inlet of compressor 19. In one example, the pressures are measured from pressure sensor, although they may also be estimated/inferred.

Next, in step 316, the routine determines MAF and calculates the ratio of pressure ($P_{2C}$) at the outlet of compressor and pressure $P_{1C}$ at the inlet of compressor. Thus, an operation point on a VNT compressor map may be determined. Note that other approaches can be used to determine whether conditions in which surge may occur are present. For example, engine speed, air temperature, turbine speed, or other parameters may also be used.

From 316, the routine continues to 318 to determine a desired EGR and turbocharger values. In one embodiment, the routine determines a desired EGR valve opening amount and a desired turbocharger vane position based on engine operating conditions, such as engine speed, load, fuel injection amount, manifold (intake and/or exhaust) pressure, temperature, and/or combinations thereof.

Next, in 322 the routine determines whether a tip-out condition has been detected. In one embodiment, such a condition is identified when the vehicle driver releases the pedal position below a selected value, when the vehicle decelerates at or greater than a selected rate, when engine speed drops below a selected value, combinations thereof, or based on various other conditions as described herein. If so, the routine continues to 324. If not, the routine proceeds to 330, where the routine controls the EGR and turbocharger based on the desired values from 318.

Continuing with FIG. 3, in 324 the routine determines whether the actual operating conditions are close to a surge region, surge line, or surge condition, or if surge is currently occurring or detected. If not, the routine proceeds to 330. If so, the routine continues to 326 to make adjustments to engine and/or vehicle parameters to reduce the likelihood and/or level of surge. In particular, in 326 the routine adjusts EGR and turbocharging in tandem, and optionally along with other adjustments. For example, the engine controller may first adjust EGR and then adjust a turbocharger parameter, or vice versa. Alternatively, the engine controller may adjust both EGR and turbocharging concurrently. Still further, the engine controller may adjust EGR to a greater extent (such as a relative basis, percent basis, or others) than turbocharging, or vice versa. In one embodiment, the controller can first adjust EGR, and then adjust the turbocharger under a first set of conditions (such as speed, load, etc.), and then first adjust the turbocharger and then EGR under a second set of conditions. Likewise, the relative amounts of adjustment may vary with the operating condition of the engine.

In one embodiment, the routine increases an EGR valve opening and decreases an amount of expansion through the turbocharger from the desired values in 318 to reduce the likelihood or level of surge. From this, the routine controls the EGR and turbocharger in block 328. For example, turbocharging expansion may be decreased by opening a variable nozzle coupled to the turbocharger, changing turbine geometry, or opening a waste gate coupled to the turbocharger.

In one embodiment, EGR valve area and the turbocharger expansion can be adjusted concurrently. In other embodiments, they may be both be adjusted, but serially. For example, the EGR valve may be opened until it reaches a maximum opening, and then the turbocharger may be adjusted until it reaches its maximum position (of minimum expansion), or vice versa. In still other embodiments, different approaches may be used under different conditions. For example, the concurrent adjustment may be used under some conditions, and serial adjustment may be used under other conditions. Such operation may be advantageous in that under some conditions, it is desired to rapidly reduce the likelihood of surge, whereas under other conditions it may be desired to maintain a selected level of driveability and/or emissions. In still another embodiment, while both EGR and expansion may both be adjusted concurrently, one parameter may be adjusted to a greater extent than the other. For example, EGR valve adjustments may be used to a greater extent than turbocharger expansion adjustments. In this way, it is possible to increase the pressure differential between the intake manifold and exhaust manifold (where the intake manifold pressure is greater than exhaust manifold pressure), where the intake manifold pressure is built up during deceleration or tip-out conditions, so that enough gas in the intake manifold can flow to the exhaust manifold and effectively drain the intake manifold. Such operation can thus reduce the likelihood or level of surge through the synergistic effect of both actions.

In one embodiment, the controller may utilize maximum EGR valve position and maximum VNT position when closest to the likelihood of surge, or if surge is actually detected. Maximum VNT operation can reduce pressure expansion ratio across turbine, while lower turbine inlet pressure, i.e. lower exhaust manifold pressure, will help to accelerate the back flow of intake air to exhaust side via the maximum EGR valve position.

Figure 4:
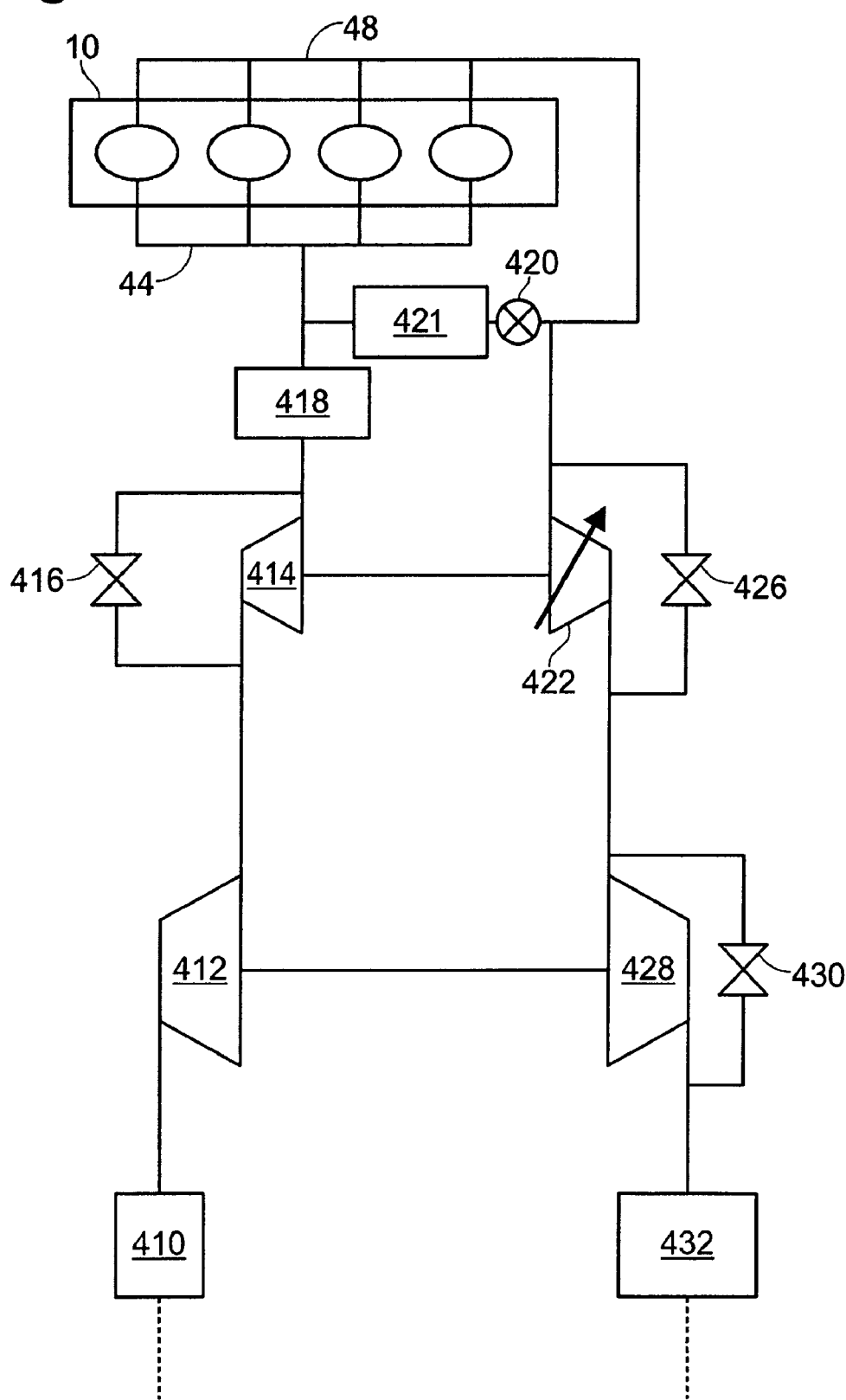
FIG. 4 is an alternative embodiment of a turbocharged engine.

Referring now to FIG. 4, an alternative embodiment is shows illustrating a high pressure and low pressure turbocharged engine. In this example, a four cylinder engine 10 is shown with an intake manifold 44 and an exhaust manifold 48. In this example, a 2-stage turbocharger system is shown, where air passes first through an air filter 410 and then to a low pressure compressor 412. Next, the air passes to a high pressure compressor 414, with adjustable bypass valve 416, and then to charge air cooler 418.

On the exhaust side, the exhaust manifold is coupled to an EGR passage through adjustable valve 420, where the EGR passage includes a cooler 421. Exhaust gas may flow from the exhaust manifold to a high pressure variable geometry turbocharger 422 having adjustable bypass valve 426, and then to a low pressure turbine 428 having adjustable bypass valve 430, before proceeding to the remainder of the exhaust system 432.

As described above, pressure may build up on the compressor side during tip-out conditions. However, by adjusting the bypass valve 416, it is possible to reduce pressure build up between two stage compressors. Further, because pressure can drop quickly on the turbine side during tip-out conditions, increasing opening of the VGT 422 (e.g., to wide open VGT operation, for example) can create a larger positive pressure differential between compressor outlet and turbine inlet. Further still, increasing opening of the EGR valve 420 (e.g., to wide open, for example) will enable air to flow from the intake manifold to the exhaust manifold through the EGR passage. IN this way, it will be possible to utilize the exhaust passage to drain the intake manifold and thus avoid surge on the compressor side.

It will be appreciated that the configurations and embodiments disclosed herein are exemplary in nature, and that these specific embodiments are not to be considered in a limiting sense, because numerous variations are possible. For example, the above valve can be applied in a variety of areas, including various types of engines, such as V-6, V8, V10, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling engine having an intake manifold and an exhaust manifold, where an exhaust gas recirculation path with a valve is provided between said intake and exhaust manifold, the engine having a turbocharger, the method comprising:

during at least one decreased engine output condition, increasing opening of the exhaust gas recirculation valve and decreasing exhaust expansion through a turbine of the turbocharger and thereby reducing a likelihood of turbocharger surge, where said increasing opening of the exhaust gas recirculation valve and decreasing exhaust expansion through a turbine of the turbocharger includes opening the exhaust gas recirculation valve to a greater extent than decreasing the expansion ratio.

2. The method of claim 1 wherein said decreasing exhaust expansion through the turbocharger is increasing opening of a variable nozzle vane coupled upstream of the turbine.

3. The method of claim 1 wherein said decreasing exhaust expansion through the turbocharger is changing geometry of blades in said turbine.

4. The method of claim 1 wherein said decreased engine output conditions include a driver tip-out.

5. The method of claim 1 wherein said decreased engine output conditions include vehicle deceleration.

6. The method of claim 1 wherein increasing opening of the exhaust gas recirculation valve and decreasing exhaust expansion through a turbine of the turbocharger includes varying an amount of said increasing and said adjusting as an operating parameter varies.

7. The method of claim 6 wherein said operating parameter includes engine speed.

8. The method of claim 6 wherein said operating parameter includes a rate of deceleration.

9. The method of claim 1 wherein increasing opening of the exhaust gas recirculation valve and decreasing exhaust expansion through a turbine of the turbocharger includes moving said exhaust gas recirculation valve before decreasing turbocharger expansion.

10. The method of claim 1 wherein increasing opening of the exhaust gas recirculation valve and decreasing exhaust expansion through a turbine of the turbocharger includes, under a first set of conditions, moving said exhaust gas recirculation valve before decreasing turbocharger expansion, and under a second set of conditions, said moving said exhaust gas recirculation valve after decreasing turbocharger expansion.

11. A method for controlling engine having an intake manifold and an exhaust manifold, where an exhaust gas recirculation path with a valve is provided between said intake and exhaust manifold, the engine having a turbocharger, the method comprising:

during at least one decreased engine output condition, increasing opening of the exhaust gas recirculation valve and decreasing exhaust expansion through a turbine of the turbocharger and thereby reducing a likelihood of turbocharger surge, where said increasing opening of the exhaust gas recirculation valve and decreasing exhaust expansion through a turbine of the turbocharger includes moving the exhaust gas recirculation valve after decreasing exhaust expansion through the turbine.

12. A method for controlling engine having an intake manifold and an exhaust manifold, where an exhaust gas recirculation path with a valve is provided between said intake and exhaust manifold, the engine having a turbocharger, the method comprising:

during at least one decreased engine output condition, increasing opening of the exhaust gas recirculation valve and decreasing exhaust expansion through a turbine of the turbocharger and thereby reducing a likelihood of turbocharger surge, where said increasing opening of the exhaust gas recirculation valve and decreasing exhaust expansion through a turbine of the turbocharger includes moving the exhaust gas recirculation valve before decreasing exhaust expansion through the turbine.

13. A system for an engine having an intake manifold and an exhaust manifold, comprising:

an exhaust gas recirculation path provided between said intake and exhaust manifold;

a variably adjustable valve within said exhaust gas recirculation path;

a turbocharger coupled to the exhaust manifold, the turbocharger having variable expansion; and a controller having a computer readable storage medium, the medium having code for increasing opening of the exhaust gas recirculation valve, and decreasing exhaust expansion through the turbocharger and thereby reducing a likelihood of turbocharger surge during at least one decreased engine output condition, the medium further comprising code for moving the exhaust gas recirculation valve before decreasing turbocharger expansion under a first set of conditions, and moving the exhaust gas recirculation valve after decreasing turbocharger expansion under a second set of conditions.

14. The system of claim 13 wherein said medium further comprises code for opening the exhaust gas recirculation valve to a greater extent than decreasing the expansion ratio decreased.

* * * * *